United States Patent
Lumpp

(10) Patent No.: US 7,566,751 B2
(45) Date of Patent: Jul. 28, 2009

(54) SULFONATE FUNCTIONAL POLYVINYL ACETALS

(75) Inventor: Andreas Lumpp, Sao Paulo (BR)

(73) Assignee: Kuraray Europe GmbH, Frankfurt am Main (DE)

( * ) Notice: Subject to any disclaimer, the term of this patent is extended or adjusted under 35 U.S.C. 154(b) by 283 days.

(21) Appl. No.: 11/569,777

(22) PCT Filed: Jun. 23, 2005

(86) PCT No.: PCT/EP2005/006820

§ 371 (c)(1),
(2), (4) Date: Nov. 29, 2006

(87) PCT Pub. No.: WO2006/002832

PCT Pub. Date: Jan. 12, 2006

(65) Prior Publication Data

US 2008/0076871 A1    Mar. 27, 2008

(30) Foreign Application Priority Data

Jul. 1, 2004    (DE) .................. 10 2004 031 972

(51) Int. Cl.
*C08F 8/10*    (2006.01)

(52) U.S. Cl. ............... 524/593; 525/156; 525/330.6; 523/160; 523/161

(58) Field of Classification Search .............. None
See application file for complete search history.

(56) References Cited

U.S. PATENT DOCUMENTS

| 4,130,539 | A | | 12/1978 | Wegmann |
| 5,376,447 | A | * | 12/1994 | Yeung et al. ............... 428/350 |
| 5,387,641 | A | * | 2/1995 | Yeung et al. ............... 524/557 |
| 5,466,751 | A | | 11/1995 | Gutweiler et al. |
| 5,559,175 | A | | 9/1996 | Kroggel et al. |
| 2003/0040575 | A1 | | 2/2003 | Stark et al. |
| 2004/0252169 | A1 | * | 12/2004 | Chen et al. .................. 347/96 |
| 2008/0076871 | A1 | | 3/2008 | Lumpp |

FOREIGN PATENT DOCUMENTS

| DE | 2643076 C3 | 11/1981 |
| EP | 0594026 A2 | 4/1994 |
| EP | 0634447 A1 | 1/1995 |
| EP | 0923610 B1 | 5/2000 |
| EP | 1284274 A1 | 2/2003 |
| WO | WO 9825976 A2 * | 6/1998 |
| WO | 2006002832 A1 | 1/2006 |

OTHER PUBLICATIONS

Patbase Abstract corresponding to EP 923610 B.

* cited by examiner

*Primary Examiner*—David Wu
*Assistant Examiner*—Vu Nguyen
(74) *Attorney, Agent, or Firm*—Brooks Kushman P.C.

(57) ABSTRACT

Polyvinyl acetals with low solution viscosities and maximum Newtonian flow behavior contain sulphonate-functional vinyl ether or sulphonate-functional allyl ether units in addition to conventional vinyl ester, vinyl alcohol, and vinyl acetal units.

9 Claims, No Drawings

SULFONATE FUNCTIONAL POLYVINYL ACETALS

CROSS-REFERENCE TO RELATED APPLICATION

This application is the U.S. national phase of PCT Appln. No. PCT/EP2005/006820 filed Jun. 23, 2005, which claims priority to German application 10 2004 031 972.3 filed Jul. 1, 2004.

BACKGROUND OF THE INVENTION

1. Field of the Invention

The invention relates to sulphonate-functional polyvinyl acetals, a process for their preparation, and their use.

2. Description of the Related Art

The preparation of polyvinyl acetals from the corresponding polyvinyl alcohols via polymer-analogous reaction with the corresponding aldehydes has been known since as early as 1924, and in the period since then a wide variety of aldehydes has been used to prepare the corresponding polyvinyl acetals. Polyvinyl acetals are prepared in a three-stage process (polyvinyl acetate→polyvinyl alcohol→polyvinyl acetal), the result being products which still contain vinyl alcohol units and vinyl acetate units, alongside vinyl acetal groups. Polyvinyl formal, polyvinyl acetal and polyvinyl butyral have achieved particular commercial importance.

Polyvinyl butyrals are also used as binders in lacquers and specifically in printing inks, one of the reasons for this being their good pigment binding power. In this application, the organic solutions of the polyvinyl butyrals are required to have minimum solution viscosity so that they can be used to produce inks with high solids content and with maximum binder content.

The solution viscosity of polyvinyl butyral is controlled in the prior art by way of the molecular weight, by using, as starting material for the preparation of the polyvinyl butyral, polyvinyl acetates with low molecular weight or low degree of polymerization. By way of example, DE-B 2643076 (U.S. Pat. No. 4,130,539) describes the use of low-molecular-weight polyvinyl butyrals as carrier material in pigment preparations for printing inks. A disadvantage here is that considerable problems arise during the preparation of low-molecular-weight polyvinyl butyrals via acetalization of low-molecular-weight polyvinyl alcohols, because solutions of low-molecular-weight, completely hydrolysed polyvinyl alcohols tend, inter alia, to gel, and therefore have to be handled at temperatures of at least 50° C. EP 923610 B1 proposes, in order to obtain low solution viscosity, preparing the polyvinyl acetals from copolymers of vinyl acetate and 1-alkylvinyl acetate.

SUMMARY OF THE INVENTION

An object underlying the invention was to provide polyvinyl acetals which exhibit improved rheological properties as binders in lacquers and in particular in printing inks, namely lower solution viscosity and a maximum of newtonian flow behaviour.

The invention provides sulphonate-functional polyvinyl acetals having from 0.1 to 50% by weight of comonomer units which derive from sulphonate-functional vinyl ethers and from sulphonate-functional allyl ethers.

DETAILED DESCRIPTION OF THE PREFERRED EMBODIMENTS

Suitable sulphonate-functional vinyl ethers and sulphonate-functional allyl ethers are vinyl- and allyloxyalkylsulphonates having unbranched or branched $C_1$-$C_6$-alkyl groups, which may be unsubstituted or substituted. Preference is given to allyloxyalkyl-sulphonates of $C_2$-$C_4$-alkylsulphonates, e.g. allyloxy-methylsulphonate, allyloxyethylsulphonate, allyloxy-propylsulphonate, allyloxyisopropylsulphonate, allyloxy-n-butylsulphonate, which may be unsubstituted or substituted. Suitable substituents are polar groups, e.g. hydroxy, amino or carboxy groups, preferably hydroxy groups. 1-Allyloxy-2-hydroxypropylsulphonate is most preferred.

The sulphonate-functional polyvinyl acetals preferably contain from 0.5 to 20% by weight, more preferably from 3 to 15% by weight, of sulphonate-functional vinyl ether units and sulphonate-functional allyl ether units, in each case based on the total weight of the polyvinyl acetal.

Preferred sulphonate-functional polyvinyl acetals contain
a) from 20 to 70% by weight of vinyl acetal units,
b) from 10 to 30% by weight of vinyl alcohol units,
c) from 0.5 to 20% by weight of vinyl- and/or allyloxyalkylsulphonate units,
d) from 1 to 10% by weight of vinyl ester units, based in each case on the total weight of the sulphonate-functional polyvinyl acetals, where the data in % by weight always give a total of 100% by weight.

The vinyl acetal units a) derive from vinyl alcohol units which have been acetalized with one or more aldehydes from the group encompassing aliphatic and aromatic aldehydes having from 1 to 15 carbon atoms. Preferred aldehydes from the group of the aliphatic aldehydes having from 1 to 15 carbon atoms are formaldehyde (vinyl formal unit), acetaldehyde (vinyl acetacetal unit), propionaldehyde (vinyl propanal unit), and, most preferred, butyraldehyde (vinyl butyral unit), or a mixture composed of butyraldehyde and acetaldehyde. An example of an aromatic aldehyde which may be used is benzaldehyde or its derivatives.

Suitable vinyl esters d) are vinyl esters of unbranched or branched carboxylic acids having from 1 to 15 carbon atoms. Preferred vinyl esters are vinyl acetate, vinyl propionate, vinyl butyrate, vinyl 2-ethylhexanoate, vinyl laurate, vinyl pivalate, and vinyl esters of α-branched monocarboxylic acids having from 5 to 13 carbon atoms, e.g. VeoVa9$^R$ or VeoVa10$^R$ (trade names of Resolution). Vinyl acetate is preferred.

The invention also provides a process for the preparation of sulphonate-functional polyvinyl acetals by means of acetalization of hydrolysed vinyl ester copolymers of one or more monomers from the group encompassing vinyl esters of unbranched or branched alkane carboxylic acids having from 1 to 15 carbon atoms, and of sulphonate-functional vinyl ether and/or sulphonate-functional allyl ether comonomers, having ≧50 mol % of vinyl alcohol units, with one or more aldehydes from the group encompassing aliphatic and aromatic aldehydes having from 1 to 15 carbon atoms.

The vinyl ester copolymers may be prepared in a known manner; preferably via bulk polymerization, suspension polymerization, or polymerization inorganic solvents, most preferably in alcoholic solution. At least a portion of the sulphonate-functional vinyl ether comonomers or sulphonate-functional allyl ether comonomers is preferably used as an initial charge with the vinyl ester monomer, and the reaction is initiated by means of an initiator feed. Examples of suitable solvents and regulators are methanol, ethanol, propanol, isopropanol. The polymerization process is carried out at reflux at a temperature of from 50° C. to 100° C., and is initiated by a free-radical route, via addition of familiar initiators. Examples of familiar initiators are percarbonates, such as cyclohexyl peroxydicarbonate, or peresters, such as tert-butyl perneodecanoate or tert-butyl perpivalate. Molecular weight can be adjusted in a known manner via addition of the regulator, via the solvent content, via variation of the initiator concentration, and via variation of the temperature. Once the polymerization has ended, the solvent is removed by distillation, as also, if appropriate, are the excess monomer and the regulator.

The vinyl ester copolymers are hydrolysed in a manner known per se, for example by the belt process or kneader process, in an alkaline or acidic medium, with addition of acid or base. The solid vinyl ester resin is preferably taken up in alcohol, for example methanol, the solids content being set to from 15 to 70% by weight. The hydrolysis process is preferably carried out in a basic medium, for example via addition of NaOH, KOH or NaOCH$_3$. The amount of base generally used is from 1 to 5 mol % per mole of ester units. The hydrolysis process is carried out at temperatures of from 30° C. to 70° C. Once the hydrolysis process has ended, the solvent is removed by distillation, and the vinyl alcohol copolymer is obtained as a powder. The resultant hydrolysed vinyl ester copolymers have a degree of hydrolysis of $\geq 50$ mol %. Degrees of hydrolysis of from 70 to 90 mol % are preferred.

The acetalization process uses one or more aldehydes from the group encompassing aliphatic and aromatic aldehydes having from 1 to 15 carbon atoms. Preferred aldehydes from the group of the aliphatic aldehydes having from 1 to 15 carbon atoms are formaldehyde, acetaldehyde, propionaldehyde and, most preferred, butyraldehyde, or a mixture composed of butyraldehyde and acetaldehyde. An example of an aromatic aldehyde which may be used is benzaldehyde or its derivatives.

For the acetalization process, the hydrolysed vinyl ester copolymers are preferably taken up in an aqueous medium. The solids content of the aqueous solution is usually set at from 5 to 30% by weight. The acetalization process takes place in the presence of acidic catalysts, such as hydrochloric acid, sulphuric acid or phosphoric acid. The pH of the solution is usually set to values <1 via addition of 20% strength hydrochloric acid. Once the catalyst has been added, the solution is cooled, preferably to from −10° C. to +30° C., and the acetalization reaction is initiated via addition of the aldehyde. The amount to be added here depends on the desired degree of acetalization. Because the acetalization process proceeds with almost complete conversion, the amount to be added can be determined via simple stoichiometric calculation. Once addition of the aldehyde has ended, the acetalization process is completed via heating of the mixture to from 20° C. to 60° C. and stirring for more than one hour, preferably for from 1 to 6 hours, and the pulverulent reaction product is isolated via filtration.

The low intrinsic viscosity of solutions of the sulphonate-functionalized polyvinyl acetals makes them particularly suitable for use in printing ink compositions. Suitable printing ink formulations are known to the person skilled in the art and generally comprise from 5 to 20% by weight of pigment content, for example of diazo or phthalocyanine pigments, and from 5 to 15% by weight of polyvinyl acetal binder and solvent, for example of alcohols, such as ethanol, or esters, such as ethyl acetate. If appropriate, other additives may also be present, e.g. coupling agents, retardants, plasticizers, and other additives such as fillers or waxes.

Other application sectors for the sulphonate-functional polyvinyl acetals are applications as binder in corrosion-protection compositions. The sulphonate-functional polyvinyl acetals are moreover also suitable as binder in the ceramics industry, specifically as binder for unfired ceramic products. Mention may also be made of the use as binder for ceramic powders and metal powders in injection moulding (powder injection moulding), and as binder for the internal coating of cans, if appropriate in combination with crosslinking agents, such as epoxy resins.

The examples below serve for further illustration of the invention, without in any way restricting the same:

Preparation of the vinyl ester copolymers:

COMPARATIVE EXAMPLE 1

5 ml of a 20% strength methanolic solution of dibutyl peroxycarbonate were added at 57° C., with stirring (100 rpm) to a mixture of 360 g of vinyl acetate and 354 g of methanol in order to initiate the reaction. A total of 35 ml of this initiator solution was then metered in over a period of 225 minutes. 45 minutes after the start of the initiator feed, 437 g of vinyl acetate were used as feed over a period of 2 hours. Once the initiator feed had ended, stirring of the mixture was continued at reflux for a further 2 hours. Cooling gave a 68% by weight polymer solution.

INVENTIVE EXAMPLE 2

5 ml of a 20% strength methanolic solution of dibutyl peroxycarbonate were added at 57° C., with stirring (100 rpm) to a mixture of 334 g of vinyl acetate, 27 g of 1-allyloxy-2-hydroxypropylsulphonate, and 354 g of methanol in order to initiate the reaction. A total of 35 ml of this initiator solution was then metered in over a period of 225 minutes. 45 minutes after the start of the initiator feed, a further 405 g of vinyl acetate and a further 32 g of the allyl ether were used as feed over a period of 2 hours. Once the initiator feed had ended, stirring of the mixture was continued at reflux for a further 2 hours.

COMPARATIVE EXAMPLE 3

The procedure was analogous to that of Inventive Example 2, except that instead of the sulphonate-functional allyl ether in each case the same amount of an allyl polyglycol ether having about 23 ethylene oxide units (polyglycol A1100) was used.

COMPARATIVE EXAMPLE 4

The procedure was analogous to that of Inventive Example 2, except that instead of the sulphonate-functional allyl ether in each case the same amount of undecenoic acid was used.

COMPARATIVE EXAMPLE 5

The procedure was analogous to that of Inventive Example 2, except that instead of the sulphonate-functional allyl ether in each case the same amount of crotonic acid was used.

Each of the resin solutions obtained in Comparative or Inventive Examples 1 to 5 was hydrolysed using the following mixing specification to give the polyvinyl alcohol:

713 g of a resin solution adjusted to 30% by weight solids content were covered with 233 g of methanol. After addition of 48 ml of a 15% strength methanolic NaOH solution, stirring (200 rpm) was then started at 30° C. After 210 minutes, the hydrolysis process was terminated by acetic acid (adjustment to pH 7). The precipitated vinyl alcohol copolymer was isolated by filtration, washed with methanol, and dried.

After each of the resin solutions of Comparative or Inventive Examples 1 to 5 had been hydrolysed it was acetalized with butyraldehyde, using the following mixing specification:

150 ml of a 20% strength solution of the vinyl alcohol copolymer and 125 ml of HCl (20% strength) were stirred at stirrer rotation rate 450 rpm into an initial charge composed of 338 ml of deionized water, and the mixture was cooled to 0° C. 23.8 ml of butyraldehyde were then metered in over a period of 45 minutes. After the feed time of 45 minutes, the suspension was held at 0° C. for a further 40 minutes before then being heated to 25° C. over a period of 105 minutes. The reaction was completed over 90 minutes at this temperature. The suspension was then filtered and the product was repeatedly rinsed with deionized water, and dried.

The following products were obtained:

COMPARATIVE EXAMPLE 6

Non-functionalized polyvinylbutyral from Comp. Ex. 1.

INVENTIVE EXAMPLE 7

Allylsulphonate-functionalized polyvinyl butyral from Inv. Ex. 2.

COMPARATIVE EXAMPLE 8

Allyl-polyglycol-ether-functionalized polyvinyl butyral from Comp. Ex. 3.

COMPARATIVE EXAMPLE 9

Undecenoic-acid-functionalized polyvinyl butyral from Comp. Ex. 4.

COMPARATIVE EXAMPLE 10

Crotonic-acid-functionalized polyvinyl butyral from Comp. Ex. 5.

Rheology was tested in the following printing ink mixing specification:

Preparation of printing inks:

Each of the polyvinyl butyrals of Comparative or Inventive Examples 6 to 10 was used to produce a varnish whose flow time is 40 seconds in the DIN cup (4 mm aperture) to DIN 53211. 20.8 parts by weight of each varnish were then mixed with 21.7 parts by weight of a solvent mixture composed of ethanol and methoxypropanol (4:1 parts by weight) and with 7.5 parts by weight of pigment (Rubinrot, Irgalith 4BGL) in a disperser over a period of 60 minutes.

Rheological measurement:

Rheology was tested after one day by means of a cone- and plate-rheometer with the following settings: diameter 50 mm, angle 1°. Upward curve and downward curve in each case from 0.2/sec to 1000/sec over a period of 1 minute. Viscosity was measured with a shear gradient of D=10/s, D=100/s, D=1000/s, and the upward curve was measured at $D_A$=10/s.

The results are given in the table below:

|  | Comp. Ex. 6 | Inv. Ex. 7 | Comp. Ex. 8 | Comp. Ex. 9 | Comp. Ex. 10 |
| --- | --- | --- | --- | --- | --- |
| D = 10/sec | 3640 | 82 | 3820 | 1810 | 4420 |
| D = 100/sec | 423 | 55 | 450 | 480 | 542 |
| D = 1000/sec | 105 | 44 | 107 | 130 | 133 |
| $D_A$ = 10/sec | 527 | 90 | 69 | 1130 | 800 |

The results show that unfunctionalized polyvinyl butyral (Comp. Ex. 6) and polyvinyl butyrals functionalized with functional groups other than sulphonate functions (Comp. Ex. 8-10) give markedly higher viscosities than the allylsulphonate-functionalized polyvinyl butyral from Inventive Example 7. Furthermore, it is only with allylsulphonate-functionalized polyvinyl butyral that identical viscosities are obtained in the upward and downward curves (newtonian flow behaviour, absence of thixotropy).

The invention claimed is:

1. Sulphonate-functional polyvinyl acetals comprising from 0.1% to 50% by weight of residues derived from vinyloxyalkyl or allyloxyalkyl substituted sulfonic acid, selected from the group consisting of vinyloxyalkylsulphonates and allyloxyalkylsulphonates having unsubstituted or substituted, unbranched or branched $C_1$-$C_6$-alkyl groups, and mixtures of vinyloxyalkylsulfonates and allyloxyalkylsulphonates.

2. The sulphonate-functional polyvinyl acetals of claim 1, comprising:
   a) from 20% to 70% by weight of vinyl acetal units,
   b) from 10% to 30% by weight of vinyl alcohol units,
   c) from 0.5% to 20% by weight of vinyl- or allyloxyalkyl-sulphonate units or mixtures thereof,
   d) from 1% to 10% by weight of vinyl ester units, the weight percentages are based on the total weight of the sulphonate-functional polyvinyl acetates.

3. A process for preparing a sulphonate-functional polyvinyl acetal of claim 1, comprising acetalizing a hydrolysed vinyl ester copolymer of one or more monomers comprising vinyl esters, unbranched or branched $C_{1-15}$ alkane carboxylic acids, sulphonate-functional vinyl ether and/or sulphonate-functional allyl ether comonomer(s), having ≧50 mol % of vinyl alcohol units, with one or more $C_{1-15}$ aliphatic aldehydes, $C_{6-15}$ aromatic aldehydes, or mixtures thereof.

4. The process of claim 3, wherein at least one aliphatic aldehyde selected from the group consisting of formaldehyde, acetaldehyde, propionaldehyde, and butyraldehyde, is used for acetalizing.

5. In a printing ink containing at least one pigment and employing a polymer binder, the improvement comprising employing as at least one binder, a sulphonate-functional polyvinyl acetal of claim 2.

6. The printing ink composition of claim 5, comprising from 5 to 20% by weight of pigment, and from 5 to 15% by weight of sulphonate-functional polyvinyl acetal binder and solvent.

7. In a corrosion protection composition, an unfired ceramic composition, a metal powder composition, or can coating composition, where an organic binder is employed, the improvement comprising selecting as at least one binder, a sulphonate-functional polyvinyl acetal of claim 1.

8. A can coating composition of claim 7, further comprising a crosslinking agent.

9. The composition of claim 8, wherein said crosslinking agent comprises an epoxy resin.

* * * * *